United States Patent [19]

Cachat

[11] 4,438,310

[45] Mar. 20, 1984

[54] METHOD AND APPARATUS FOR INDUCTIVELY HEATING VALVE SEAT INSERTS

[75] Inventor: John F. Cachat, Cleveland, Ohio

[73] Assignee: Park Ohio Industries, Inc., Cleveland, Ohio

[21] Appl. No.: 501,755

[22] Filed: Jun. 13, 1983

Related U.S. Application Data

[63] Continuation of Ser. No. 349,037, Feb. 16, 1982, abandoned, which is a continuation of Ser. No. 147,829, May 8, 1980, abandoned.

[51] Int. Cl.³ .......................... H05B 6/40; H05B 6/14
[52] U.S. Cl. ............................... 219/10.43; 219/10.57; 219/10.49 R; 219/10.79; 148/145; 148/150; 266/129
[58] Field of Search ............... 219/10.43, 10.41, 10.57, 219/10.79, 10.75, 10.79, 10.49 R; 148/145, 146, 149, 150; 266/124, 129

[56] References Cited

U.S. PATENT DOCUMENTS

| Re. 29,046 | 11/1976 | DelPaggio | 219/10.57 |
|---|---|---|---|
| 2,440,316 | 4/1948 | Unterweiser | 219/10.69 X |
| 2,448,690 | 9/1948 | Storm | 219/10.57 X |
| 2,905,798 | 9/1959 | Freutel | 219/10.43 |
| 3,935,059 | 1/1976 | Ayel | 219/10.43 |

Primary Examiner—B. A. Reynolds
Assistant Examiner—Philip H. Leung

Attorney, Agent, or Firm—Body, Vickers & Daniels

[57] ABSTRACT

A method and apparatus for heating a conical valve seat surface of a valve seat ring insert which has been previously press fitted or molded into an engine component such as an engine head. The method and apparatus includes mounting an inductor for reciprocal movement axially toward and away from the valve seat of the engine head and biasing the inductor toward the valve seat, encircling the inductor with an axially biased electrically conducting hollow ring-shaped magnetic flux shield through which a coolant is circulated, and moving the inductor and conducting ring shield toward the valve seat of the engine head to locate the inductor in a preselected position providing the necessary magnetic coupling gap between the inductor and valve seat surface of the valve seat insert while the conducting ring shield is maintained in heat transfer surface contact with and stray flux shielding relation to the portion of the engine head immediately around the valve seat surface of the insert. Energization of the inductor results in inductive heating of the valve seat surface of the insert preparatory to the quench hardening thereof. During the inductive heating of the insert, the cooled conductive ring shield acts to prevent excessive heating, by induction and by heat conduction from the heated insert, of the aluminum metal of the engine head around the valve seat insert such as would normally destroy the pressure fit therebetween and damage the surrounding aluminum metal.

8 Claims, 3 Drawing Figures

METHOD AND APPARATUS FOR INDUCTIVELY HEATING VALVE SEAT INSERTS

This is a continuation of Ser. No. 349,037 filed Feb. 16, 1982 which is a continuation of Ser. No. 147,829 filed May 8, 1980, both abandoned.

INCORPORATION BY REFERENCE

Incorporated by reference herein is prior U.S. Pat. Re. 29,046, assigned to the same assignee herein, which discloses a method and apparatus for inductively heating conical surfaces of valve seats of an engine component.

BACKGROUND OF THE INVENTION

This invention relates to the art of induction heating and, more particularly, to a method and apparatus for inductively heating valve seat inserts of an engine component, such as an engine head.

The invention is particularly applicable for heating exhaust valve seat inserts in an aluminum cast engine head, and it will be described with reference thereto; however, it must be appreciated that the invention has broader applications and may be used for heating various types of valve seats in engine heads of various material and for heating similar types of work surfaces.

Internal combustion engines generally employ conically shaped valve seats which coact with reciprocating poppet valves for controlling flow of gases to and from the engine cylinders. During operation of the engine, the exhaust valves are subjected to extremely high temperatures and therefore experience a substantial amount of wear. To counteract this wear and increase the physical properties of the exhaust valve seat, the conical surface of the exhaust valve seat may be inductively heated during manufacture thereof. Subsequent to this inductive heating, the valve seat is quench hardened through conventional liquid or mass quenching. Induction heating of multiple valve seats in an engine component may be adapted to automatic processing of the engine head in a single operation such as by the use of a gang type induction heating apparatus wherein a like multiple of single turn inductors are individually positioned immediately adjacent to the conically shaped exhaust valve seats. Additionally, it is necessary to provide accurate and uniform magnetic coupling between the separate inductors and the conical surface of the valve seats.

U.S. Pat. No. Re. 29,046 discloses an apparatus for positioning circular inductors a common, preselected distance from conical surfaces of a body member, when such surfaces are to be inductively heated by the apparatus. The inductors are independently, reciprocably movable perpendicular to the body member or valve seats and biased in a direction toward the valve seats. A common frame from which the inductors are outwardly biased is moved into contact with the engine component and each inductor contacts the valve seat which it is to heat. Prior to moving the frame backwardly a distance generally corresponding to the desired magnetic coupling distance for the separate inductors, the inductors are locked to the frame. U.S. Pat. Nos. 3,761,669 and 3,777,096 assigned to the same assignee are likewise in point.

The above-identified U.S. Pat. No. Re. 29,046 is concerned primarily with induction heating of exhaust valve seats in a gray cast iron, engine head. As a direct result of efforts to increase gasoline mileage and the consequential reduction in weight of motor vehicles, aluminum is increasingly used in engine components. While the use of aluminum for the manufacture of the major components of the engine, engine block and head, provide substantial benefit in weight reduction of the total engine, the re-engineering of significant mechanical portions of the engine are necessitated by the use of aluminum in these major components. Aluminum heads of internal combustion engines, in particular, necessitate re-engineering the manufacturing methods used to provide valve seats therein for conventional overhead valve engine design. In this respect, the aluminum material cannot provide sufficient strength and hardness in order for efficiently wearing valve seat surfaces to be constructed therein.

In order to enable aluminum to be used in internal combustion engine heads, it has been determined that exhaust valve seat surfaces must be provided through the use of an insert constructed of hardenable metal material installed within the aluminum cast head through any suitable process, such as pressure applied force fit or integral casting within the head. Regardless of the method used to produce the aluminum head with metal inserts therein, machining of the inserts subsequent to casting or insertion is required to assure accurate location and concentricity of the valve seat surfaces. Since machining of the conically shaped valve seat surfaces is not possible once hardening of the material has occurred, the operations of machining and hardening must occur subsequent to installation of the inserts in the aluminum head. Machining of the conical surface of the insert does not present any unusual problems; however, hardening of the surface must occur without any deleterious effects to the pressure fit between the aluminum head and the metal insert.

The temperature customarily required to sufficiently harden an exhaust valve seat surface is approximately 1700° F. Depending upon the particular alloy of aluminum used for casting the engine head, the melting point of the casting aluminum ranges from 1200°-1400° F. Inherent difficulties in hardening an exhaust valve seat insert previously provided within a cast aluminum engine head are readily apparent. Despite the fact that the required heat for hardening might be capable of being directed immediately onto the metal insert to be hardened, conduction of the heat through the insert to the cast aluminum occurs. If the heat to which the surrounding aluminum is subjected, during induction heating of the insert, results in the aluminum becoming expanded, a breakdown of the pressure fit between the metal insert and the cast aluminum head then is likely to occur. Thus, while hardened metal valve seat inserts in aluminum cast engine heads are necessary, and machining and subsequent hardening of the inserts in place in the head is desired, the temperature required to harden the insert heretofore has rendered the hardening impractical in the immediate environment of the cast aluminum.

SUMMARY OF THE INVENTION

The present invention is related to induction heating of a metal valve seat insert within an engine component, such as an engine head, subsequent to installation and machining of the insert within an engine head of cast aluminum material.

The present invention further relates to a method and apparatus for accurately positioning an inductor with respect to a valve seat insert to inductively heat the insert preparatory to quench hardening while maintaining the pressure fit between the metal insert and a cast aluminum engine head through control of the conduction of heat from the heated insert into the aluminum head and the prevention of induction heating of the aluminum head by the inductor.

In accordance with the present invention, there is provided an induction heating device for heating a conical valve seat surface of a valve seat insert ring in a cast aluminum engine head preparatory to quench hardening. The valve seat ring insert is positioned coaxially within the recessed exhaust port of an exhaust passageway in the engine head and the head is provided with a bore axially aligned with the exhaust port for receiving the stem of a poppet valve. An inductor is mounted for reciprocative movement generally along the axis of the bore in the present invention. In addition, the inductor is biased in a direction axially of, and toward the plane of the valve seat insert. A generally cylindrical ring or shield, constructed of an electrically conducting material such as copper, is arranged to be moved to a position exteriorly concentric with respect to the inductor and is biased relative thereto in a direction generally along the axis of and toward the exhaust port.

Movement of the inductor and conducting ring is arranged to occur in a direction generally along the axis of the bore and toward the cast aluminum engine head. This movement of the inductor and conducting ring results, in the preferred form of the invention, in contact between the conducting ring and both the valve seat insert and the engine head immediately adjacent to and concentric with the insert. Once contact has been made between the conducting ring and the engine head and insert, the inductor is moved further toward the engine head and then positioned so that a selected magnetic coupling distance or gap exists between the valve seat surface and the inductor. During this positioning movement of the inductor into its selected magnetic coupling or heating position, the conductive ring remains biased against the valve seat ring insert and against the engine head around the ring insert. In this manner, the inductor is spaced from the valve seat surface a critical and necessary magnetic coupling distance while contact is maintained between the conducting ring and the engine head and the insert. This contact with the engine head and insert by the conductive ring, which may be water-cooled and is insulated from the inductor, together with the action of the conductive ring to shield the inductive energy of the inductor from and so prevent it from penetrating and inductively heating the aluminum metal of the engine head around and adjacent to the valve seat ring insert, then combine to prevent excessive heating of the engine head by the inductive energy of the inductor and by conduction of heat from the heated ring insert such as would damage the aluminum of the engine head around the valve seat ring insert and destroy the pressure fit between the insert and the engine head.

The primary object of the present invention is the provision of a method and apparatus for inductively heating a conical surface of a valve seat insert in a cast aluminum internal combustion engine head, which method and apparatus is relatively simple in operation and structure.

Another object of the present invention is the provision of a method and apparatus for inductively heating a valve seat insert in an aluminum engine head which will not cause overheating of and resultant damage to the aluminum metal of the engine head immediately surrounding the insert.

Still another object of the present invention is the provision of a method and apparatus for inductively heating a valve seat insert having a pressure fit in an aluminum engine head, which heating method and apparatus will not result in destruction of the pressure fit between the insert and engine head.

A further object of the present invention is the provision of a method and apparatus for inductively heating a conical surface of a valve seat insert in a cast aluminum head for an internal combustion engine, which method and apparatus provide accurate control of magnetic coupling between an inductor and the valve seat surface while substantially preventing the inductive heating of the engine head and also conducting away from the aluminum engine head the heat conducted thereto from the heated insert.

BRIEF DESCRIPTION OF THE DRAWINGS

The invention may take physical form in a variety of parts and arrangements of parts, preferred embodiments of which will be described in the following specification and illustrated in the accompanying drawings which form a part hereof and wherein.

DETAILED DESCRIPTION OF THE PREFERRED EMBODIMENT

Figure 1:
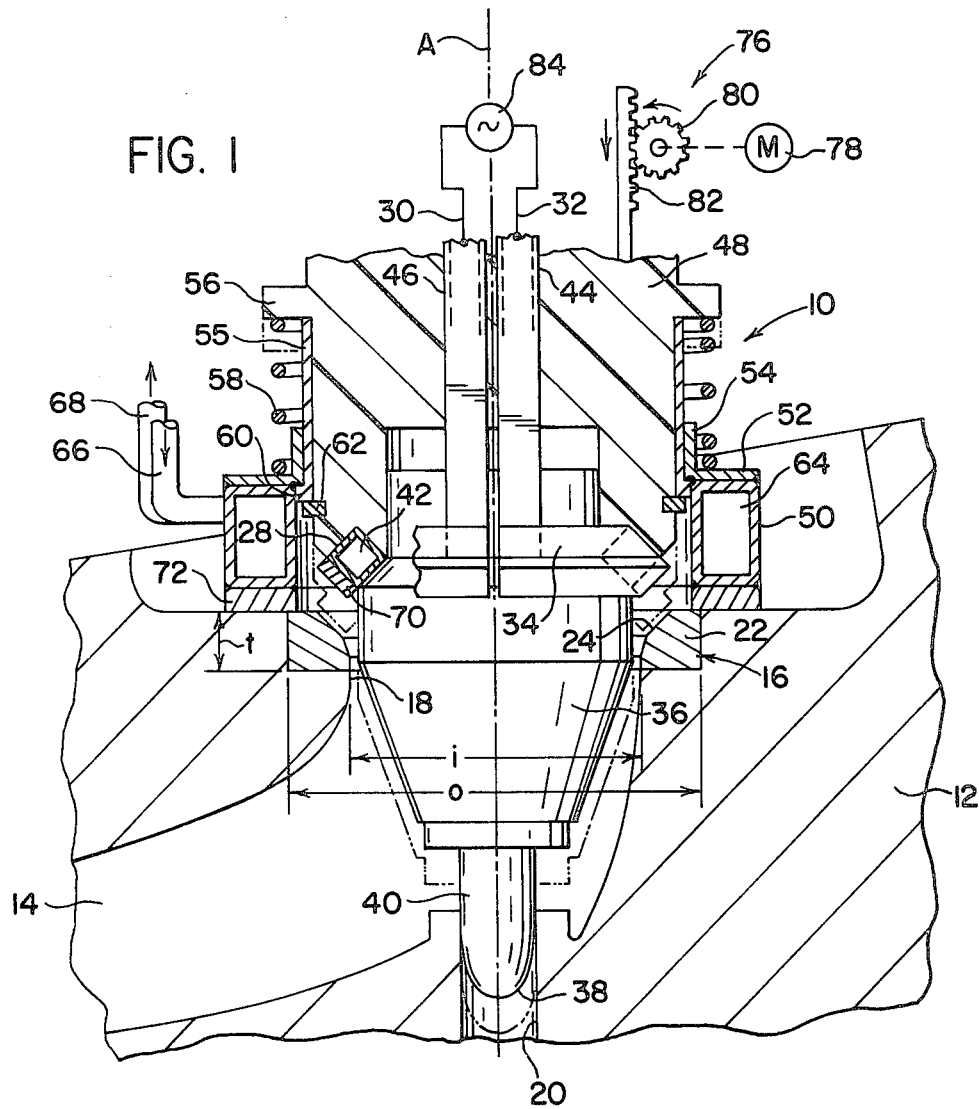
FIG. 1 is a partial cross-sectional view illustrating the preferred embodiment of the present invention.

Referring now to the drawings wherein the showings are for the purpose of illustrating preferred embodiments of the invention only, and not for the purpose of limiting the invention, FIG. 1 shows an induction heating device 10 and a cast aluminum engine head 12 operatively positioned relative to one another. Engine head 12 includes at least one exhaust passageway 14 having a valve seat insert 16 within a recessed cylindrical exhaust port 18 having a central axis A. The engine head 12 is further provided with a guide bore 20 coaxial with the exhaust port axis A and through which a stem of a normal poppet valve (not shown) of an internal combustion engine is adapted to extend. Insert 16 comprises a ring 22 having an inner diameter 'i', outer diameter 'o', and thickness 't'. The specific dimensions of ring 22 may be of any suitable size convenient for ease of manufacture of the ring and compatible with the particular engine head. Inner surface of insert 16 is provided with a conically shaped valve seat surface 24. Insert 16 is installed within cast aluminum engine head 12 by any one of a number of conventional methods, such as by a pressure force fit or by integral casting. The insert is a standard component usually made of steel, cast iron or sintered powdered iron.

Induction heating of the valve seat in preparation for the hardening thereof may encompass simultaneous inductive heating of multiple valve seat inserts 16. In such a case, precise positioning of each independent induction device 10 relative to each of the several conical seat surfaces to provide the same preselected magnetic coupling gap between the respective inductors and valve seat inserts becomes extremely important. The apparatus of the above mentioned U.S. Pat. No. Re.

29,046, incorporated by reference herein would be functional for such purpose, with substitution of the induction heating device of the present invention, to simultaneously inductively heat the multiple valve seat inserts to the required processing temperature.

Figure 2:
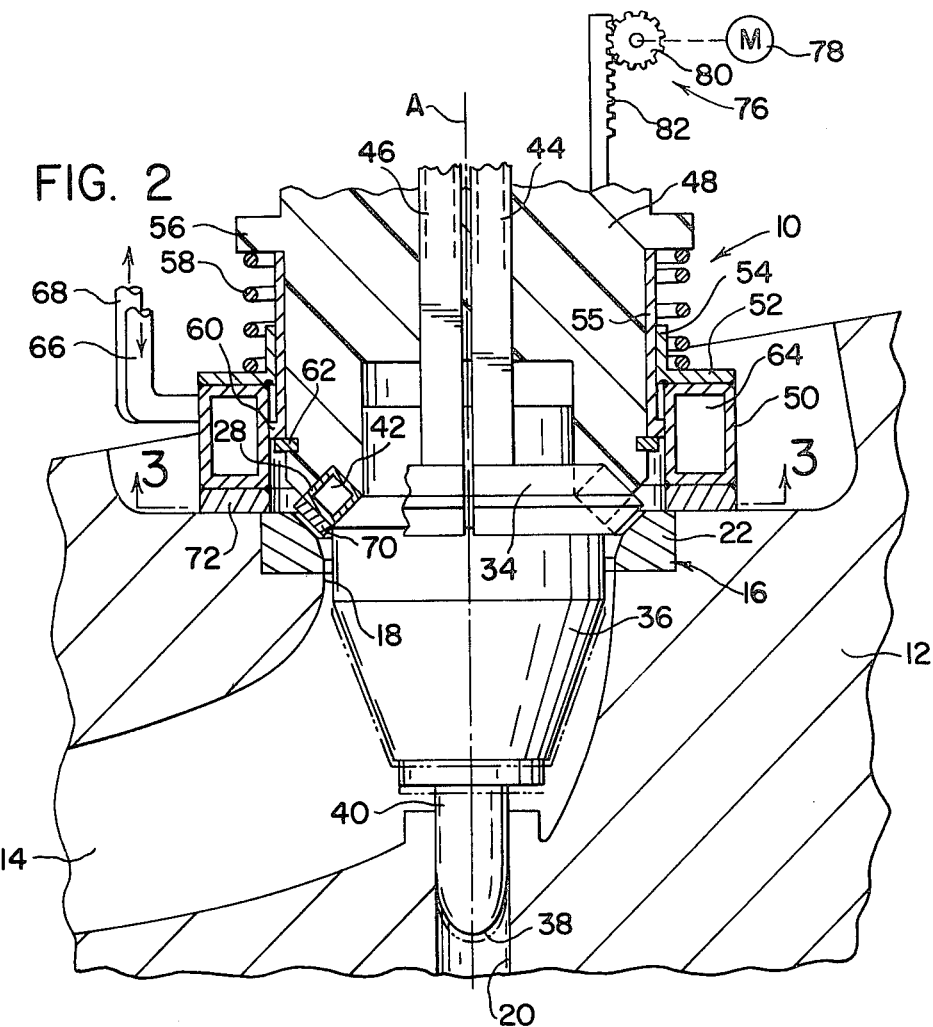
FIG. 2 is a partial cross-sectional view further illustrating the preferred embodiment of the present invention; and, FIG. 3 is a cross-sectional view taken generally along line 3—3 of FIG. 2.

Referring now more particularly to FIGS. 1 and 2, inductor device 10 is shown to include a generally circular, single turn inductor 28. Inductor 28 is a split circular hollow ring 34 of copper, more clearly indicated in FIG. 3, and has connector leads 30 and 32 electrically connected to opposite ends of split hollow ring 34. Inductor 28 may, in fact, be somewhat elliptical to provide uniform heating as is known in the art. At one end of inductor device 10 there is provided an electrically insulated insert 36 in the inductor device 10 which holds the inductor 28 in place therein and also supports an outwardly extending tip member 38. Tip 38 includes a cylindrical shaft 40 dimensioned to coact with the valve stem receiving bore 20 of engine head 12 to axially align the inductor device 10 with the exhaust port 18. Shaft 40 is intended to register with bore 20 as inductor device 10 moves toward the engine head and causes inductor 28 to shift radially into concentric relationship and axially align with conical valve seat 24.

There is provided a system for cooling inductor 28 by the passage of a suitable coolant through the hollow interior 42 of the inductor ring 34. The coolant flows from a source of supply thereof (not shown) through a inlet tube 44 communicating with the hollow interior of the split ring 34 at one end and then flows out the other end of the split ring 34 through an outlet tube 46. The coolant is required to have a temperature maintained at a preselected level through a device (not shown) which does not form part of the instant invention.

As noted above, inductive heating of metal insert 16 immediately adjacent to and within the cast aluminum mass comprising engine head 12 may result in deterioration of the pressure fit between the insert and the head and damage the aluminum metal of the head. For purposes of avoiding this pressure fit deterioration and metal damage, a cylindrical ring or flux shield 50 constructed of a material also readily conducive to the conduction of heat therethrough, namely copper, is arranged to concentrically surround body 48 of inductor device 10 and contact the insert 16 and immediately surrounding portion of the engine head 12 when the inductor 28 is in its operative position for inductive heating of the valve seat insert 16. For this purpose, the conductive ring or shield 50 is made of smaller inside diameter than the outside diameter of the insert 16, and it may be either mounted on and carried by the body 48 of the inductor device 10 as shown in the form of the invention illustrated in the drawings, or it may be separate therefrom and moved into its operative position shown in the drawings by suitable operating means (not shown). Body 48 is constructed of any suitable electrically and thermally insulating material. This insulating material prevents electrical current from being conducted between contacts 30 and 32 of the inductor and to conducting ring or shield 50 and also prevents heat from being conducted to inductor device 10.

In the form of the invention shown in the drawings, the conducting ring 50 is mounted on the body 48 for axial movement relative to the inductor device 10, and it is biased outwardly toward the tip end 38 of the inductor device and toward the engine head 12. For this purpose, the conducting ring 50 is provided with a peripheral mounting flange 52 welded or otherwise fastened thereto and having a cylindrical sleeve portion 54 slidable on the body 48 for movement of the ring 50 axially of the inductor device 10. A relative thin bearing sleeve or liner 55 may be provided on the cylindrical exterior surface of body 48 to prevent undue wear of the body by sliding contact with conducting ring 50. The body 48 is also provided with an outwardly extending flange 56, and a compression coil spring 58 is installed between flanges 52 and 56 to provide a continuous axially outward extending force on conducting ring 50. An outwardly extending flange 60 on the lower end of the bearing sleeve 55 engages with the underside of the mounting flange 52 on conductor ring 50 to retain the latter in place on the body 48 against the axial force of spring 58. The bearing sleeve 55 is in turn secured in place on the body 48 by a split ring 62 which is snap inserted into an annular groove in the cylindrical outer surface of the body 48 and which allows for assembly of conducting ring 50, bearing sleeve 55 and spring 58 over the body 48. The flanges 60 and 62 are both of smaller outside diameter than the inside diameter of the conductive ring 50 so as not to interfere with the axial sliding movement of the ring 50 along the body 48 in a direction to disengage the flange 52 on the ring from the stop flange 60 on sleeve bearing 55.

It should be understood that when inductor 10 moves toward engine head 12 for the purpose of positioning the inductor 28 immediately adjacent and in its selected magnetically coupled relation to insert 16, conducting ring 50 likewise moves toward engine head 12 and into contact therewith. The relative dimensions of inductor device 10 and conducting ring 50 are arranged to cause the flat bottom surface of the conducting ring to contact the flat coplanar top surfaces of the insert 16 and the immediately surrounding portion of the aluminum mass of which head 12 is constructed. Since conducting ring 50 is biased outwardly relative to the inductor device by spring 58, the conducting ring contacts the head 12 and insert 16 prior to any contact of the insert by the inductor 28, and compression spring 58 undergoes compression as the inductor device 10 continues to move or overtravels toward head 12.

It is contemplated that the conical valve seat surface of the insert 16 be mass quenched, without a quenching liquid, by cooling, after the initial energization of the inductor 28 for a period of approximately 5 to 7 seconds, by the cooling or heat sink action of the surrounding metal of the insert. Thereafter, the inductor can be again energized at a lower power level for a short time, such as 3 to 5 seconds, to further heat the insert before disengagement or removal of the inductor device 10 from the engine head 12.

Figure 3:
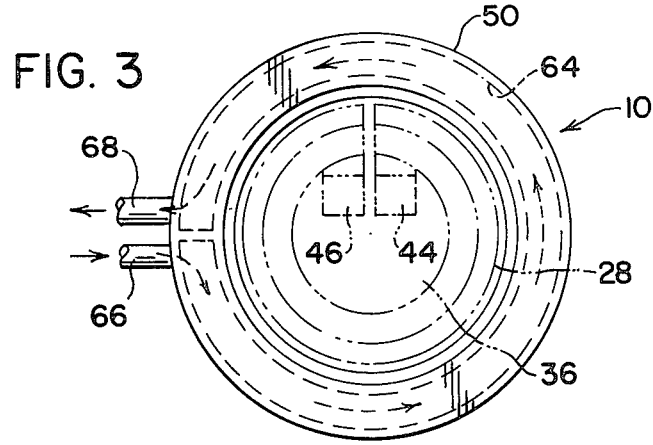

As in the case of inductor 28, a system for cooling conducting ring 50 is provided. For such purposes, the copper conducting ring 50 is constructed of hollow form to provide an internal cavity or passageway 64 therein. Conducting ring 50 and thus passageway 64 effectively completely encircle inductor device 10, with the ring being a split ring as shown in FIG. 3 similar to the inductor. Passageway 64 carries coolant for the purpose of maintaining the temperature of conducting ring 50 at a preselected level. Coolant enters cavity 64 through an inlet 66, flows completely through the cavity and exits through an outlet 68 for return to a device (not shown) which maintains the temperature of the coolant at the preselected level.

Since both inductor 28 and conducting ring 50 are preferably constructed of copper and further are constructed of hollow form to provide respective internal coolant passageways 42 and 64, the resulting strength of the inductor and conducting ring are relatively low. Because the conductive ring 50, and in some cases the inductor 28 also, are required in accordance with the invention, to continuously engage head 12 and insert 16 with a certain degree of pressure thereagainst, the structural integrity of both of these hollow elements 50 and 28 may be fortified. Thus, a relatively thin, electrically conducting metallic layer or pad 70 of copper is secured to the face of inductor 28 to strengthen it. Conducting ring 50 likewise has a thin layer or pad 72 of a suitable heat conducting, metallic material permanently secured to the face thereof, to prevent wear of the ring and strengthen it so as to readily absorb the shock of contact between the conducting ring and head 12. Metallic layer 72 is likewise constructed of copper which is heat conductive so that heat build-up in head 12 and insert 16 transfers therefrom through conducting ring 50 to the coolant flowing through the internal passageway 64 thereof.

Operation of inductor device 10 begins with the positioning of inductor device 10 relative to engine head 12 such that it is generally aligned with the axis A of the exhaust port 18 and with the conical valve seat 24 of insert 16. As noted above, the aluminum head may in fact have a number of exhaust valve ports 18 having inserts 16 which are to be inductively heated simultaneously with apparatus such as shown in U.S. Pat. Re. 29,046 and provided with a gang of individual inductor devices 10 corresponding in number to the number of exhaust ports 16 with inserts 16 to be heated. With the inductor device 10 positioned generally in alignment with exhaust port 18, a drive mechanism 76 for reciprocating the inductor device 10 is actuated to move the inductor device toward engine head 12. In this regard, a motor 78 causes a gear 80 to rotate in a counter-clockwise direction as shown in FIG. 1, which in turn drives rack gear 82 downwardly. Rack gear 82 is connected to inductor device 10 by any suitable means and therefore results in the movement of the inductor device toward head 12. Continued movement of the inductor device 10 toward the engine head 12 results in shaft 40 entering valve guide bore 20 in the engine head to cause alignment of the inductor device relative to exhaust port 18. As inductor device 10 continues to further move toward engine head 13, conducting ring 50 engages the valve seat insert 16 and the immediately surrounding portion of the engine head, as shown in FIG. 1.

Drive mechanism 76 continues to move the inductor device 10 further toward head 12 in an overtravel movement, causing flange 56 of body 48 to compress spring 58 and moving the inductor 28 further toward the valve seat 24 of the insert. As noted above, a predetermined magnetic coupling gap between the face of wear pad 70 and valve seat surface 24 is necessary in order to obtain efficient conductive heating of the surface. Accordingly, the drive mechanism 76 may be arranged to move the inductive device 10 downwardly to a selected position providing the appropriate magnetic coupling gap. In the event that a plurality of valve seat inserts 16 are being inductively heated simultaneously in the engine head 12, the multiple inductor devices 10 required in such case may be driven by the drive mechanism 76 to move the inductors 28 into engagement with the respective valve seat inserts 16 in the engine head 12 and the inductor devices 10 then axially backed off to space the inductors 28 the necessary distance from the valve seats 24 to provide the selected magnetic coupling gap between the valve seat 24 of each insert 16 and the opposing face of the wear pad 70 on each inductor 28, as disclosed in the aforementioned U.S. Pat. No. Re. 29,046. In practice, the appropriate magnetic coupling gap is approximately 0.040 inches.

Once inductor device 10 has been properly positioned relative to valve seat insert 16, inductor 28 is energized by providing electrical current to leads 30 and 32 from a power supply 84 as shown in FIG. 1 to cause inductive heating of the valve seat surface 24 of the insert 16. During this inductive heating of valve seat surface 24, the conductive ring or flux shield 50 acts to shield the aluminum metal of the engine head 12 immediately surrounding the insert 16 from penetration and inductive heating by stray flux generated by the inductor 28. In addition, the cooled conductive ring 50 in contact with this surrounding aluminum metal of the engine head 12 acts as a heat sink to conduct away from and out of the insert 16 and surrounding aluminum metal of the head 12 the heat carried thereinto by conduction from the inductively heated valve seat surface 24. The flux shielding and cooling action of the conductive ring 50 thus combine to effectively prevent excessive heating of the surrounding aluminum metal of the head 12 and resulting destruction of the pressure fit or bond between the valve insert 16 and engine head 12 and damage to the aluminum metal around the insert. Subsequent to the inductive heating of conical valve seat surface 24, the inductor device 10 is removed or disengaged from head 12 by reverse operation of drive mechanism 76, and quenching of the heated valve seat surface 24 may be undertaken by a mechanism not forming part of the present invention.

Modifications, changes and improvements to the preferred forms of the invention herein disclosed, described and illustrated may occur to those skilled in the art who come to understand the principles and precepts thereof. Accordingly, the scope of the invention disclosed herein should not be limited to the particular embodiments of the invention set forth herein, but rather should be limited only by the advance by which the invention has promoted the art.

Having thus described the invention the following is claimed:

1. A method of inductively heating a conical valve seat surface of a valve seat insert coaxially aligned within a bore in an engine component, said insert having a lower coefficient of thermal expansion than said engine component, said method comprising the steps of: providing a ring inductor having a face generally matching said valve seat surface; positioning said inductor in generally axially aligned relation to said valve seat insert with the said face located opposite and spaced a selected distance from said valve seat surface; energizing said inductor to inductively heat said valve seat surface; and shielding the portion of said engine component immediately surrounding said insert from penetration and inductive heating by stray flux generated by said inductor during the said energizing thereof.

2. A method as specified in claim 1 and including the step of positioning a copper ring immediately around and electrically insulated from said inductor and in surface contact with the portion of said engine component immediately surrounding said insert to effect the said shielding of said surrounding engine component portion from penetration and inductive heating by said stray flux.

3. A method of inductively heating a conical valve seat surface of a valve seat insert coaxially aligned within a bore in an engine component, said insert having a lower coefficient of thermal expansion than said engine component, said method comprising the steps of: providing a ring inductor having a face generally matching said valve seat surface; positioning said inductor in generally axially aligned relation to said valve seat insert with the said face located opposite and spaced a selected distance from said valve seat surface; positioning a hollow, electrically and heat conductive ring around and electrically insulated from said inductor and in surface contact with both the portion of said insert surrounding and adjacent said valve seat surface and with the portion of said engine component immediately surrounding said insert; energizing said inductor to inductively heat said valve seat surface, and circulating a coolant through said hollow conducting ring, during the said energizing of the inductor, to thereby cool the said portion of said insert and the said surrounding engine component portion during the inductive heating of said valve seat surface.

4. A method as specified in claim 3 wherein the said conductive ring is formed of copper and shields the said portion of said insert and the said surrounding portion of said engine component from penetration and inductive heating by stray flux generated by said inductor during the said energizing thereof.

5. A method of inductively heating a conical valve seat surface of a valve seat insert coaxially aligned within a bore in an engine component, said insert having a lower coefficient of thermal expansion than said engine component, said method comprising the steps of:
(a) providing a single turn inductor having a conical face generally matching said valve seat surface;
(b) providing an electrically conducting flux shield ring having a generally cylindrical shape;
(c) mounting said inductor for reciprocal movement with respect to said engine component and in a direction generally parallel to an axis of said bore;
(d) mounting said conductive ring exteriorly concentric to and electrically insulated from said inductor and contacting said ring against said insert and the portion of said engine component immediately surrounding said insert;
(e) moving said inductor toward said engine component and positioning said inductor in generally axially aligned relation to said valve seat insert and with the said face located opposite and spaced a selected distance from said valve seat surface; and,
(f) energizing said inductor to thereby inductively heat said valve seat surface while maintaining said flux shield ring in contact with said insert and surrounding engine component portion to prevent flux penetration and inductive heating of said engine component portion.

6. An induction heating device for heating a conical valve seat surface of a valve seat ring insert in an engine component preparatory to quench hardening, said insert having a lower coefficient of thermal expansion than said engine component, said device comprising: a generally circular inductor having a central axis and a concentric conical face generally matching said conical valve seat surface, a pair of input leads for energizing said inductor, carrier means supporting said inductor for movement axially toward and transversely of said valve seat insert to position the said inductor in an operative inductive heating position concentrically about, and with its said conical face disposed parallel to and opposite said valve seat surface and spaced a selected distance therefrom, and an electrically conducting flux shield ring electrically insulated from and positioned concentrically about said inductor and in pressure surface contact with the portion of said engine component immediately surrounding said valve seat insert, in the said operative heating position of the inductor, to thereby shield said surrounding engine component portion from penetration and inductive heating by stray flux from said inductor.

7. A method of inductively heating a conical valve seat surface of a valve seat insert coaxially aligned within a bore in an engine component, said insert having a lower coefficient of thermal expansion than said engine component, and having an outwardly exposed facial junction between the insert and the engine component, said method comprising the steps of: providing a ring inductor having a face generally matching said valve seat surface; positioning said inductor in generally axially aligned relation to said valve seat insert with the said face located opposite and spaced a selected distance from said valve seat surface; positioning a hollow, electrically and heat conductive ring around and electrically insulated from said inductor and across said exposed junction of said engine component and said insert for reducing the heating of said component during induction heating of said insert; energizing said inductor to inductively heat said valve seat surface, and cooling portions of said insert and the said surrounding engine component immediately ajdacent said junction during the inductive heating of said valve seat surface.

8. An induction heating device for heating a conical valve seat surface of a valve seat ring insert in an engine component preparatory to quench hardening, said insert having a lower coefficient of thermal expansion than said engine component, said device comprising: a generally circular inductor having a central axis and a concentric conical face generally matching said conical valve seat surface, a pair of input leads for energizing said inductor, carrier means supporting said inductor for movement axially toward and transversely of said valve seat insert to position the said inductor in an operative inductive heating position concentrically about, and with its said conical face disposed parallel to and opposite said valve seat surface and spaced a selected distance therefrom, and means in pressure surface contact with the portion of said engine component immediately surrounding said valve seat insert to shield said surrounding engine component portion from penetration and inductive heating by stray flux from said inductor when said inductor is in the said operative heating position.

* * * * *